Jan. 19, 1960     C. W. KELLY     2,921,350
STORM WINDOW
Filed Feb. 15, 1954     4 Sheets-Sheet 2
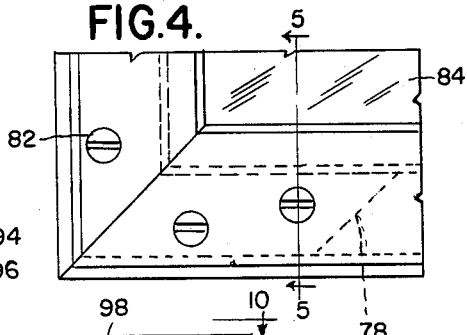
FIG.4.
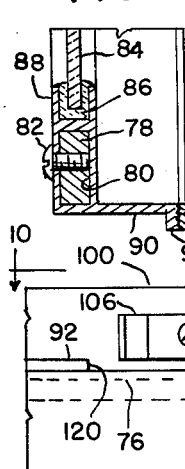
FIG.5.
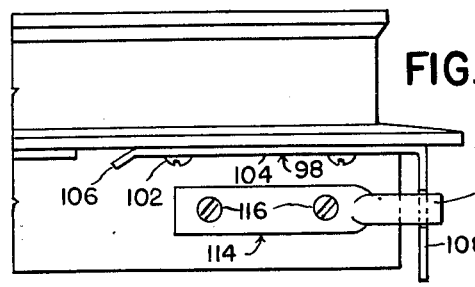
FIG.9.
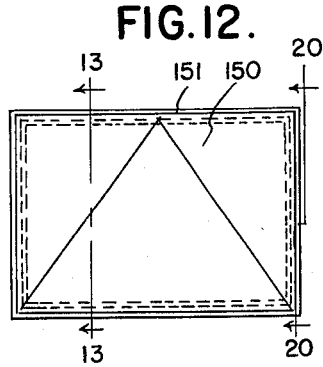
FIG.12.
FIG.10.
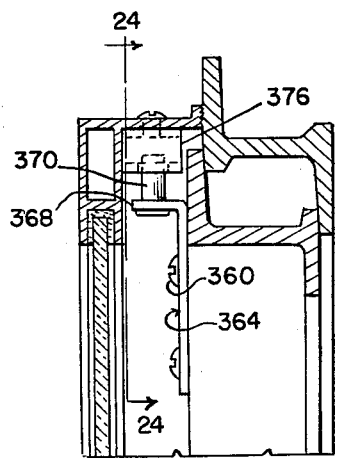
FIG.23.
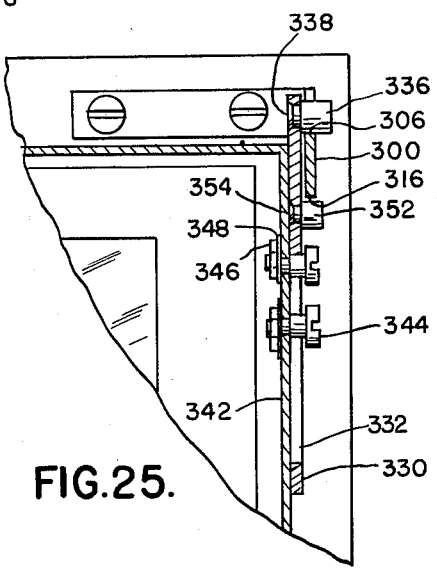
FIG.25.
INVENTOR.
CLYDE W. KELLY
BY Whittemore
Hulbert & Belknap
ATTORNEYS

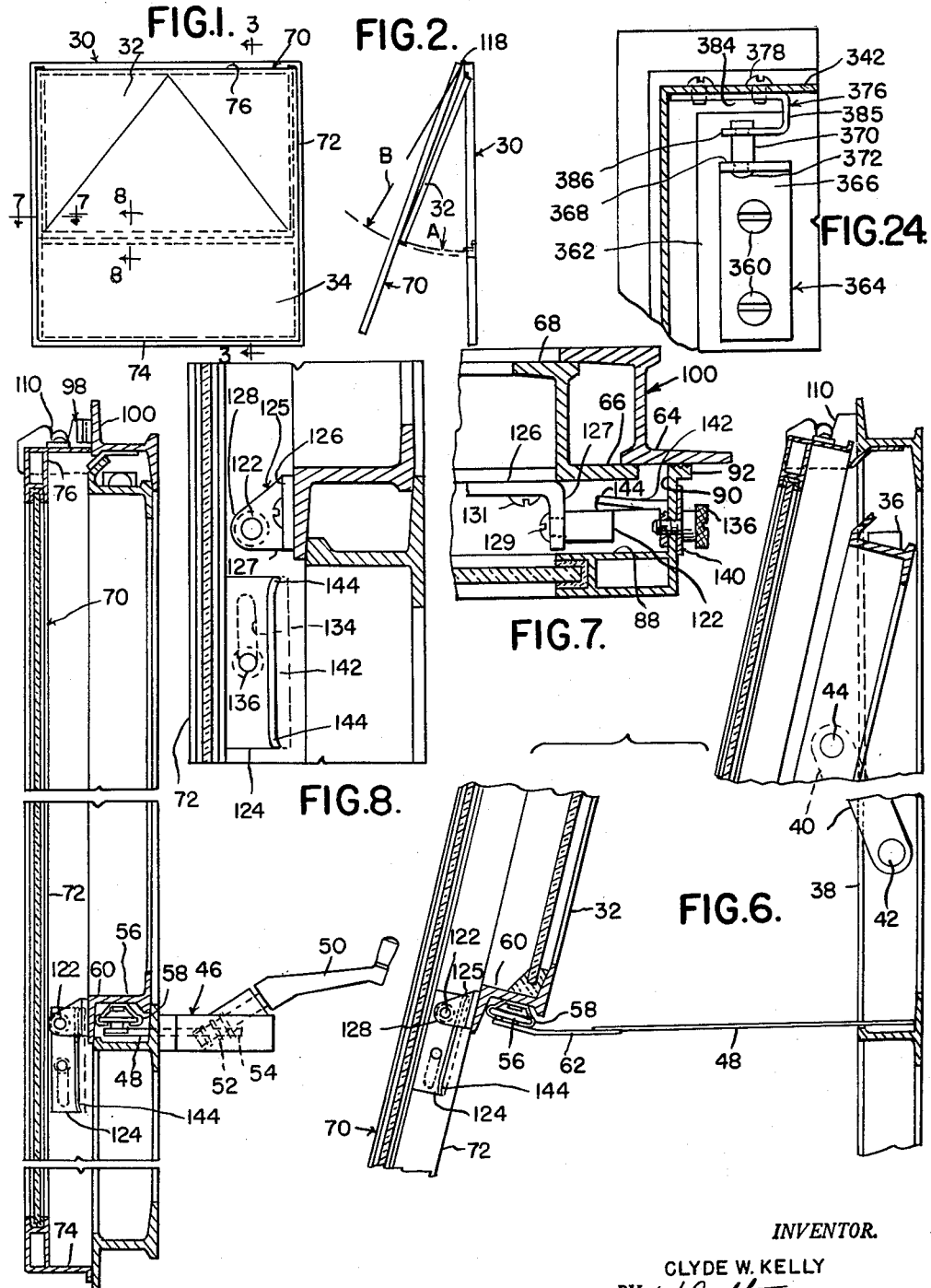

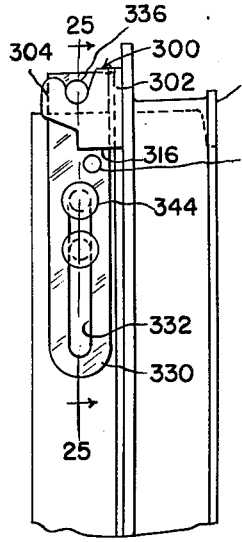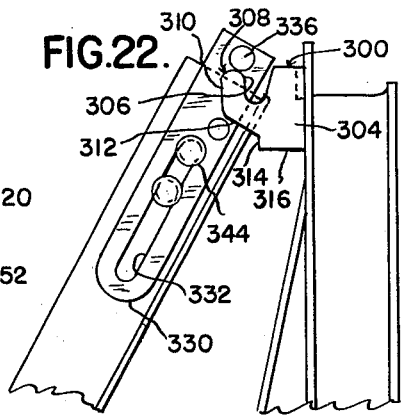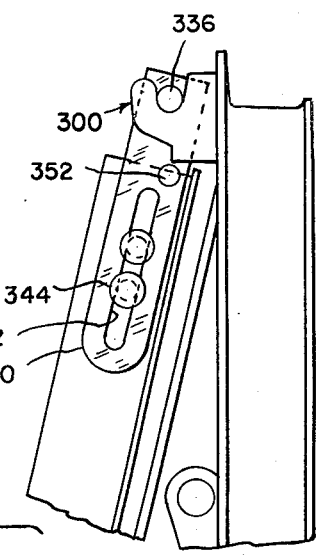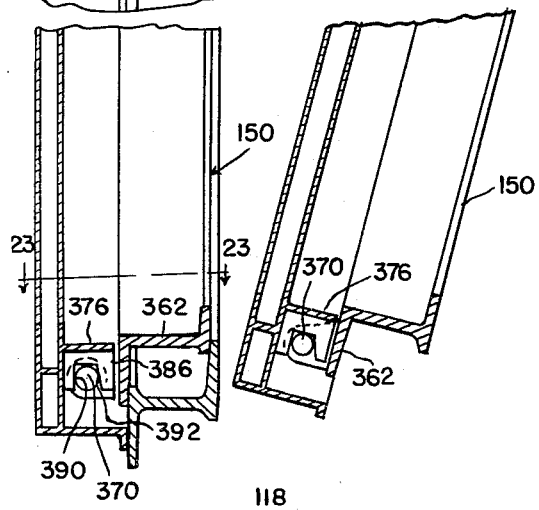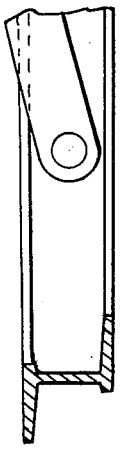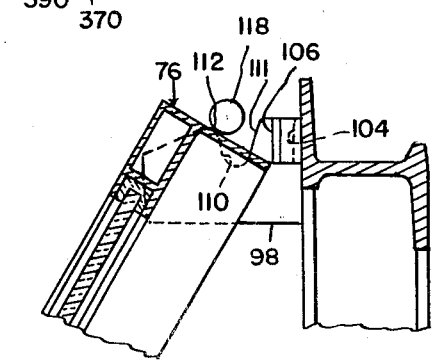

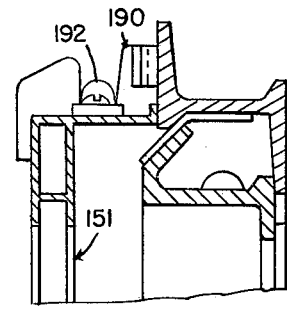
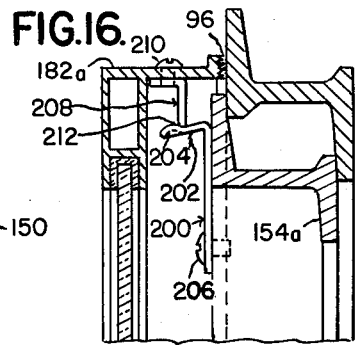
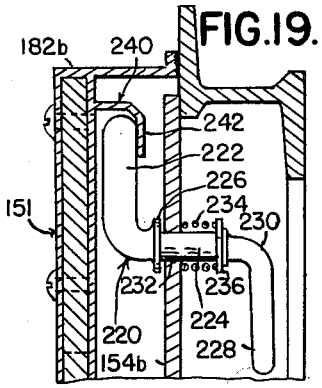
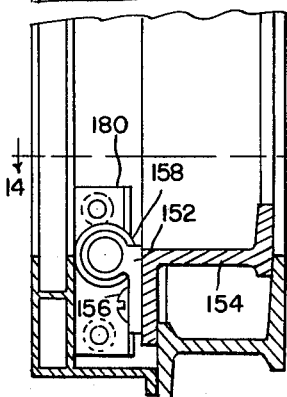
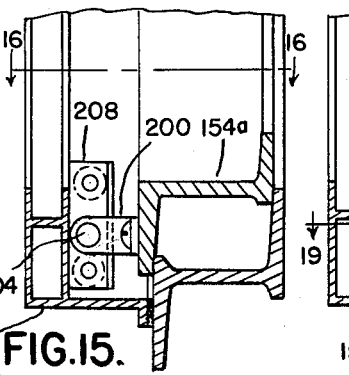
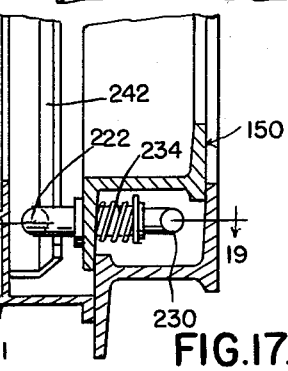
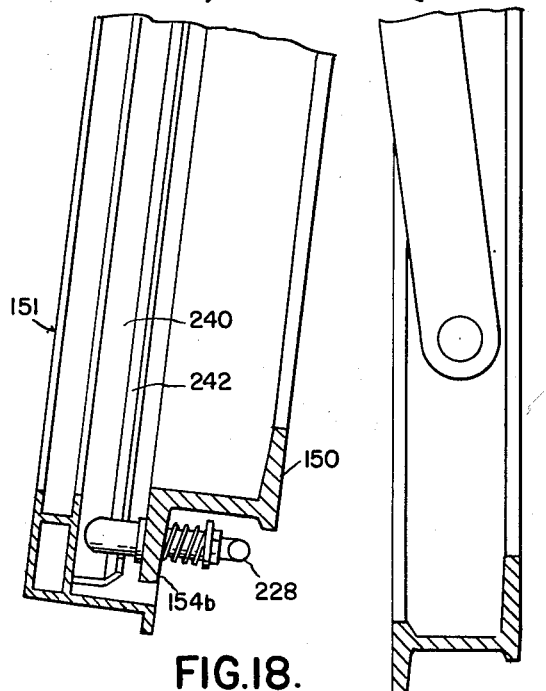
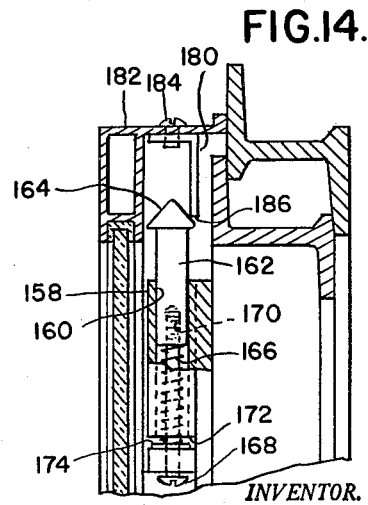

United States Patent Office 2,921,350
Patented Jan. 19, 1960

2,921,350

STORM WINDOW

Clyde W. Kelly, Detroit, Mich., assignor to Fenestra Incorporated, a corporation of Michigan Application February 15, 1954, Serial No. 410,192

10 Claims. (Cl. 20—55)

The present invention relates to a combined projected type prime window and a storm window therefor.

It is an object of the present invention to provide a prime window having an open out vent.

It is a further object of the present invention to provide a storm window for an open out vent of the character described, providing means interconnecting the storm window and vent during swinging movement of the vent with provision for relative movement therebetween.

It is a further object of the present invention to provide a storm window for an open out vent in combination with means effective to prevent separation between said storm window and vent except when said vent is swung outwardly beyond its normal full open position.

It is a further object of the present invention to provide in combination a vent adapted to swing outwardly to open position and a storm window for cooperation therewith, said storm window having means mounting it for outward swinging movement adjacent its upper edge, and means interconnecting the lower edges of said storm window and vent for relative sliding movement.

It is a further object of the present invention to provide in combination an outwardly swinging vent and a storm window for cooperation therewith, said storm window including means mounting it for outward swinging movement about an axis adjacent its upper edge, pivot means interconnecting the lower edge of said storm window and vent, and mounting means for said storm window providing for relative longitudinally sliding movement to accommodate simultaneous movement of the lower edges of said storm window and said vent in different paths.

Other objects and features of the invention will become apparent as the description proceeds, especially when taken in conjunction with the accompanying drawings, wherein:

Figure 1 shows a weather side view of a projected type prime window having an open out vent above a fixed pane of glass and with the storm window in place.

Figure 2 is a side view of the window shown in Figure 1 with the vent and storm window in an open position.

Figure 3 is an enlarged view taken on the line 3—3 Figure 1.

Figure 4 shows an enlarged partial view of one corner of the storm window.

Figure 5 is a sectional view taken on the line 5—5, Figure 4.

Figure 6 is an enlarged view similar to Figure 3, with the windows in an open position.

Figure 7 is a sectional view taken along the line 7—7 in Figure 1, looking in the direction of the arrows.

Figure 8 is an enlarged view taken along the line 8—8 in Figure 1, with the guide in a position to allow the storm window to be removed from the prime window.

Figure 9 is a partial elevational view of an upper corner showing the method of hanging the storm window to the prime window.

Figure 10 is a view taken in the direction of the arrows 10—10 in Figure 9.

Figure 11 is a partial fragmentary sectional view similar to that shown in Figure 6, showing the storm window about to be removed from the prime window.

Figure 12 shows a weather side view of a projected type window having an open out vent and with the storm window in place.

Figure 13 is an enlarged sectional view on the line 13—13, Figure 12.

Figure 14 is an enlarged sectional view taken along the line 14—14, Figure 13.

Figure 15 is a partial sectional view similar to that shown in Figure 13 showing a modified form of the invention.

Figure 16 is an enlarged sectional view taken along the line 16—16, Figure 15.

Figure 17 is a partial sectional view similar to that shown in Figure 13 showing another modified form of the invention.

Figure 18 is a view similar to that shown in Figure 17 with the windows partially open.

Figure 19 is an enlarged partial sectional view taken along the line 19—19, Figure 17.

Figure 20 is an enlarged view partly in section taken along the line 20—20, Figure 12, looking in the direction of the arrows.

Figure 21 is a view similar to Figure 20 showing the windows in a partially open position.

Figure 22 is a partial view similar to that shown in Figure 20 with the storm window about to be removed from the prime window.

Figure 23 is an enlarged sectional view taken along the line 23—23, Figure 20.

Figure 24 is a partial sectional view taken along the line 24—24, Figure 23, looking in the direction of the arrows.

Figure 25 is an enlarged sectional view taken through the line 25—25, Figure 20, looking in the direction of the arrows.

Referring now to the drawings, Figures 1 and 2 show a projected type prime window 30 having a project out vent 32 above a fixed pane of glass 34, and with the storm window attached. The vent opens outwardly with a swinging and sliding motion as best seen in Figure 6, with the shoe 36 sliding in the window frame bar 38 and the vent pivoting on the shoe. The balance arm 40 is pivoted at 42 to the frame bar 38 and at 44 to the vent and supports the vent during opening and closing. An operator 46 (Figure 3) has an arm 48 which swings outwardly and inwardly by means of the handle 50 acting through the worm 52 and the sector gear 54. The gear is cut in the arm 48 in the conventional manner. The arm 48 operates the vent 32 through the shoe 56 sliding in the guide 58 attached to the vent sill bar 60. A spring extension 62 at the end of the arm 48 allows the arm to follow the arc described by the sill bar of the vent in its outward movement. The prime window and operator described is similar to that disclosed in my copending application Serial No. 384,164 filed October 5, 1953. As best seen in Figure 7, the border bars of the fixed frame 100 include flanges 64 which are respectively engaged by weathering flanges 66 on the border bars of the frame of the prime window, such as the side border bar 68.

The storm window 70 is comprised of border bars consisting of two side bars 72, a sill bar 74, and a head bar 76. The bars are mitered at their corners and joined together by an angular corner splice member 78 (Figures 4 and 5) that fits snugly in the hollow portion 80 of the bars. Self-tapping screws 82 hold the assembly together. Prior to assembling, the bars are placed on each side of the rectangular pane of glass 84 with the glazing strip 86 separating the glass from the metal. The glazing strip can be made out of rubber, plastic, or any other suitable resilient material. The glazing strip or channel fits snugly between the inwardly extending spaced legs 88 of the frame. The frame includes a flange leg 90 extending at right angles to the legs 88 and terminating in a weathering flange formed by an enlarged portion 92 having serrations 94 along one surface. The serrations act to more readily hold the plastic adhesive weatherstripping 96 that acts as a gasket between the storm window and prime window as shown for example in Figure 16. However, if desired the storm window may be attached to the prime window with metal to metal contact as shown for example in Figure 19. The storm window bars are all of the same cross-sectional shape and preferably are extruded from a soft metal such as aluminum.

To attach the storm window to the prime window a hanger bracket 98 is attached, as illustrated in Figures 9 and 10, to the head bar of the fixed frame 100, composed of head, side and bottom border bars, by means of the screws 102. The bracket comprises a flat portion 104 having one end bent slightly outwardly to form an ear 106 for purposes later to be described. The opposite end of the portion 104 has a right angle bend forming the enlarged hanger portion 108. The rounded notch 110, as best seen in Figure 11, has one side 111 sloped away from the flat portion 104 to provide pin clearance, and the opposite side terminates in a rounded portion 112 which is less in height than the opposite side of the notch 110.

A hanger member 114 is attached to the top bar 76 of the storm window by screws 116. The hangers include rounded pin portions 118 adapted to fit snugly into the notch 110 of the hanger. The enlarged portion 92 of the top bar of the storm window is cut away at 120 (see Figure 9) to provide clearance for the bracket 98. The structure above described is duplicated at the opposite top corner of the storm window and prime window to allow the storm window to be hung in place and to swing outwardly and inwardly pivoting in the hanger brackets 98.

To hold the storm window secure to the prime window, the pin 122 and guide 124 are provided, as best seen in Figures 3, 6, 7 and 8. The bracket 125 has a flat portion 126 bent at a right angle at one end to form the portion 127 which has a rounded nose-like edge 128. The end of the pin 122 has a reduced shank which is peened over as indicated at 129 to hold the pin securely in an aperture in the portion 127. The bracket is attached adjacent the end of the vent bar 60 by screws 131. The storm window jamb bar 72 has an elongated hole 134 for the reception of a knurled headed screw 136. The guide 124 has a threaded aperture in which the screw is threaded and a cover plate 140 covers the slotted hole 134. The cover plate has an aperture which allows the threaded portion of the screw 136 to pass through. The guide 124 includes an angularly bent retainer flange 142, the corners 144 of which are bent back slightly to provide clearance for guiding the pin when the guide is moved longitudinally in the slot for purposes later to be described. The guide is held firmly in position by tightening the screw 136, and kept from turning around the screw by engagement with the inner surface of the leg 88 of the storm window bar. The structure above described is duplicated adjacent the opposite end of the vent bar 60 and on the opopsite side bar 72 of the storm window, and is adapted to hold the storm window snugly against the prime window by the guide and pin interconnection.

Referring now to Figures 2 and 6 it will be seen that upon opening or closing of the prime window vent 32 the storm window 80 also opens by the ends 128 of the brackets 125 contacting the inner surfaces of the storm window bars 72 and pushing it open. Upon closure of the prime window, pin 122 contacts the retainer flange 142 of the guide 124 and pulls the storm sash with it. As the vent 32 pivots on shoe 36 and the shoe slides in the frame bar 38 the bottom of the vents has a compound motion describing a flat arc A. The storm window in opening and closing pivots on the pin 118 and describes an arc B of a true radius. Consequently, due to the difference in the arcs described by the storm window and prime window there is relative vertical motion between the bottom edges of the two windows as illustrated by comparing the location of the pin 122 in respect to the guide 124 in Figures 3 and 6. It will be seen that the pin is closer to the top of the guide in Figure 3 than it is in Figure 6. The construction of the pin and guide assembly allows the pin to have a sliding motion in the guide with the elongated hole 134 being long enough so that the guide can be adjusted relative to the pin so that the storm window is held snugly against the prime window and still allow the pin to slide in the guide without too much friction.

To prevent accidental removal of the storm window from the prime window, the ear 106 is provided to obstruct upward motion of the storm window. To remove the storm window the screws 136 are loosened on both sides of the window and the guides 124 slid downward to the position shown in Figure 8. The pins 122 are now clear of the retainer flanges 142 and the storm window can be swung outwardly free from the vent 32 until it is in an outward position just beyond that which it occupies when attached to the vent and in a full open position. The storm window is now pushed upwardly with the inner edge of the top storm window bar 76 clearing the struck out ear 106 as shown in Figure 11. The pin 118 is raised over the rounded portion 112 and the storm window is free for removal. The storm window is attached by repeating the above process in a reverse manner.

Modified forms of the invention are shown in Figures 12 through 25. Figure 12 shows a prime window with a projected out vent 150 and with the storm window 151 attached. The construction and operation of the vent 150 is the same as for vent 32 previously described.

Referring now to Figures 13 and 14, a bracket 152 is tached to the vent sill bar 154 by screws 156. The bracket has a body portion 158 provided with a bore 160. A pin 162 slides in the bore. The pin has a head 164 of an enlarged conical shape. A spring 166 urges the pin 162 outwardly with the head of a screw 168 limiting the outward motion of the pin. A threaded aperture 170 in the pin retains the screw. A gap 172 in the body 158 allows the washer 174 to be inserted and back up the spring. A guide 180 of elongated L-shaped cross-section is attached to the inner side of the storm sash jamb bar 182 by the screws 184. The tension of the spring 166 pressing the pin against the guide 180 holds the storm window snugly against the prime window. The storm window is hung at the upper corners to the prime window by means of brackets 190 and pins 192 which are of the same construction and operate in the same manner as pin 118 and bracket 98 previously described. The vent 150 and storm window 151 have the same relative motion in opening and closing movements as shown and described in Figure 2.

The construction of the pin 164 and guide 180 assembly, which is also duplicated on the opposite side of the storm window, allows the pin to slide along the guide during opening and closing of the window while holding the storm window snugly against the prime window when the windows are in closed position. To remove the storm window it is only necessary to pull the storm window outwardly forcing the pin back into the bore until the end of the head 164 clears the edge 186 of the bracket. The storm window can then be removed from the hanger brackets 190 in the same manner as that described for storm window 70. The storm window is attached to the prime window by repeating the above process in a reverse manner.

Figures 15 and 16 show a modified form of the constructions shown in Figures 13 and 14. The spring 200 has a resilient arm 202 embossed with a spherical bump 204. The spring is attached to the sill bar 154a by the screws 206. An L-shaped guide 208 is attached to the inner side of the storm window jamb bars 182a by screws 210. The spring arm 202 presses the storm window against the prime window and by pulling outwardly on the prime window the edge 212 of the guide passes over the bump 204 to release the storm window. The construction allows for relative movement between the storm window and prime window vent in opening and closing the vent. The spring and guide assembly is also attached to the opposite side of the storm window. The storm window is hung to the upper corners of the prime window in the same manner as previously described.

Figures 17–19 show still another modification of the attaching means. The latch 220 is of round cross-section and has a latching leg 222 and a shaft-like portion 224 normally in the direction of the leg 222 with a shoulder 226 of a larger diameter than the shaft portion. A second leg or handle portion 228 is of a reduced diameter and is parallel to the leg 222 and extends in the opposite direction. A generous radius at 230 allows the leg 228 to be inserted through the aperture 232 in the vent sill bar 154b and the parts are so dimensioned to allow the shaft portion to fit snugly in the aperture. To hold the latch in position a spring 234 is provided. The spring is in turn held in position by the snap washer 236 installed in a groove in the shaft portion 224. Integral with the storm window jamb bar 182b is the channel shaped portion 240 having a leg 242 that extends the length of the bar. The assembly is dimensioned so that the spring holds the latching leg 222 against the leg 242, which in turn holds the storm window snugly in place against the prime window. By opening the prime window vent as shown in Figure 18, access is obtained to the latch handle 228 and by manually turning the handle 228 in a counterclockwise direction the latch is disengaged from the guide allowing the storm window to swing outwardly free of the window. The construction is duplicated on the opposite side of the windows and allows for relative movement between the storm window and prime window vent. The storm window is hung at the top of the prime window in the same manner previously described.

Figures 20–25 show another form of the invention with the prime window having an open out vent and the storm window attached to the weather side of the prime window. The bracket 300 has a flat portion 302 bent at right angles at one end to form the enlarged portion 304. The rounded notch 306 has one side sloped toward the portion 302 with the opposite side terminating in a rounded portion 308 which is slightly less in height than the opposite side of the notch. The lateral edge 310 turns inwardly and downwardly at an angle to form the edge 312 that terminates at a point approximately below the center of the notch 306. The edge 314 runs parallel to the lateral edge 310 to where it joins the bottom edge 316. The enlarged portion 304 is shaped and dimensioned for purposes presently to be described. The bracket 300 is attached adjacent one corner of the prime window top bar 320 by means of screws.

A bracket 330 has an elongated slot 332 and a rounded pin 336 is attached to the bracket adjacent one end by peening over the end of a reduced shank in a countersunk aperture of the body portion 334, as indicated at 338. The diameter of the pin is dimensioned to fit snugly in the notch 306 of the bracket 300. The bracket 330 is attached to the outer side of one of the jamb bars 342 of the storm window by shoulder screws 344 which have a sliding fit in the slot 332. Nuts 346 and washers 348 hold the screws in the suitable apertures of the jamb bar. The screws are furnished to prevent rotative movement of the bracket. To prevent accidental or unauthorized removal of the storm window the pin 352 is provided. It is attached to the bracket 330 by peening over a reduced shank thereon in a countersunk aperture in the bracket 330, as indicated at 354, and is so located on the bracket that it will strike the surface 316 of the bracket 300 and not allow the pin 336 to be removed from the notch 306 unless the storm window is in open position where the pin 352 can clear the surfaces of bracket 300 for removal. The bracket portion 304 is so dimensioned to cooperate with the pin 336 for this purpose. The structure above described is duplicated at the opposite side of the prime window and storm window and functions in the same manner.

Attached by screws 360 (Figures 23 and 24) adjacent the lower end of the sill bar 362 of the prime window vent is the bracket 364 having a flat portion 366 and a portion 368 turned at right angles at one end thereof. A pin 370 has a shank peened over in an aperture of the portion 368 as indicated at 372. A bracket 376 is attached to the lower inner surface of one of the storm window jamb bars 342 by screws 378. The screws pass through apertures in the jamb bar and into threaded apertures in the flat portion 384 of the bracket 376. The portion 384 has at one end a right angularly bent portion 385, and another right angularly bent portion 386 which is parallel to and spaced from portion 384. A notch 390 (Figure 20) in the portion 386 has one side 392 slightly at an angle in the direction of the vent sill bar and the other side straight. The notch is dimensioned and the bracket 376 is positioned on the bar 342 so that with the storm window on the prime window the weight of the storm window will hold the storm window snugly against the prime window by the side 392 of the notch acting against the pin 370. The above described structure is duplicated at the opposite side of the prime window and storm window in the same manner.

Upon opening the vent the storm window is swung outwardly by the pins 370 which pivot in the notches 390 while the pins 336 pivot in the notches 306 of the brackets 300. The prime window vent opens with a sliding and swinging motion as previously described and the arc described by the bottom of the vent will be flatter than that described by the bottom of the storm window and thus relative motion will exist between the storm window and the vent. The slot 332 is provided to compensate for the relative motion and allows the pin 370 to pivot in the notch 390. By referring to Figure 21 it will be seen that the pins 344 have slid downwardly in the slots 332 with the vent in a partially open position to compensate for the relative motion between the storm window and vent. Engagement between pins 352 and surfaces 316 of brackets 300 keeps pins 336 from moving out of recesses 306 in normal opening and closing of the prime and storm windows.

With the windows in the position shown in Figure 21 the storm window can be moved upwardly with the screws 344 sliding in the slot 332 until the pin 370 becomes disengaged from the notch 390. By swinging the storm window further outwardly it can be moved further upwardly until in the position shown in Figure 22, with the screw 344 bearing against the top end of the slot. The pin 336 is then raised over the rounded edge 308 and the storm window removed. The storm window is replaced by repeating the above process in a reverse manner.

In the foregoing several specific embodiments of a single basic inventive concept have been described. The problem presented in providing storm windows in conjunction with outwardly swinging projected type vents is that vents of this type are mounted for outward swinging movement about an axis adjacent one edge thereof, the pivot means providing for transverse movement of the pivot axis during opening and closing movement of the vent. Thus, the vent may be said to swing between open and closed positions with a combined sliding and swinging movement.

It is desirable to provide the storm window on the frame in which the vent is mounted. Accordingly, with normal construction, the edge of the storm window opposite to its pivoted edge moves in a true arc whereas the adjacent edge of the vent moves in a flattened or distorted arc. This prevents direct mechanical connection between the swinging edges of the storm window and vent.

In accordance with the present invention means are provided interconnecting the swinging edges of the storm window and vent so that during normal opening and closing movement of the vent, the storm window swings outwardly and inwardly in conformance therewith, the means interconnecting the swinging edges of the storm window and vent being relatively slidable for this purpose. In the several embodiments described, means are provided for effecting disengagement between the means interconnecting the swinging edges of the storm window and vent so as to permit the storm window to be swung outwardly independently of the vent to a position in which it can be removed from its supporting pivot means. In a variation of the above, the storm window and vent are provided with a true pivot connection adjacent their swinging edges and the storm window is provided with a supporting bracket which is slidable on the storm window in a direction perpendicular to the axis about which the storm window swings. In this construction there is associated with the storm window and the pivot support therefor, abutment means engageable during opening and closing movement of the vent to insure sliding of the brackets so that the storm window will remain interlocked with its pivot support.

In all cases the means mounting the storm window and interconnecting the storm window and vent include relatively slidable means to accommodate the storm window to the movement of the vent resulting from its combined sliding and swinging movement in opening and closing.

The drawings and the foregoing specification constitute a description of the improved storm window in such full, clear, concise and exact terms as to enable any person skilled in the art to practice the invention, the scope of which is indicated by the appended claims.

What I claim as my invention is:

1. A storm window construction in combination with a prime window having a vent pivoted adjacent its upper edge for outward opening swinging movement, said construction comprising mounting hangers fixed above the vent, a storm window having mounting means engaging said hangers and supporting said window for swinging movement, said mounting hangers and means comprising abutments effective to prevent separation except when the storm window is swung outwardly to an open position, and slidably associated and releasable connector elements connecting the swinging edge portions of said window to the corresponding edge portions of the vent, said elements comprising a pin extending axially parallel to the plane of said vent and adapted to be secured to the outer side of the vent, and a guide element mounted on the inner side of said window and having a flange overlying said pin, said window having a slotted frame bar, a releasable clamping member extending through the slot and engaging said guide element, said clamping member being operable from the outside of said window to disengage said guide element and pin to provide for outward swinging of said window relative to the vent to a position in which it is removable from said hangers.

2. A window construction comprising a fixed rectangular frame having border bars having flanges extending parallel to the plane of the fixed frame, a movable prime window frame mounted on said fixed frame for outward pivotal movement about pivot mounting located adjacent one edge thereof, and having border bars including weathering flanges extending outwardly parallel to the plane of the movable frame and engageable with the flanges of the border bars of said fixed frame, a movable storm window frame for a storm window mounted on said fixed frame for outward pivotal movement about an axis adjacent an edge thereof and parallel to but spaced from said pivot mounting, said movable storm window frame having border bars spaced outwardly in a direction generally perpendicular to the plane of said movable prime window frame from the flanges of the border bars of said prime window frame and including flanges extending generally perpendicular to the plane of said movable storm window frame toward said fixed frame and engageable with the flanges of the border bars of said fixed frame, pin and slot means providing a slidable interconnection between said movable frames and located in the space between the border bars of said storm window frame and the flanges of said prime window frame adjacent the edges thereof opposite their pivoted edges, said pin and slot means comprising a pin member carried by one of said movable frames and an elongated member carried by the other movable frame and having an elongated flange portion extending parallel to a bar thereof to define with the adjacent portion of the bar a pin receiving slot.

3. A construction as defined in claim 2 in which one of said members is movable on its frame parallel to the elongated flange portion to effect engagement and disengagement between said members.

4. A construction as defined in claim 2 in which one of said members is movable on its frame parallel to the elongated flange portion to effect engagement and disengagement between said members, and clamping means extending outwardly through the flange of a border bar of said storm window frame and engageable with the movable one of said members to lock it in operating position.

5. A window construction comprising a fixed rectangular frame having border bars having flanges extending parallel to the plane of the fixed frame, a movable prime window frame mounted on said fixed frame for outward pivotal movement about pivot mounting located adjacent one edge thereof, and having border bars including weathering flanges extending outwardly parallel to the plane of the movable frame and engageable with the flanges of the border bars of said fixed frame, a movable storm window frame for a storm window mounted on said fixed frame for outward pivotal movement about an axis adjacent an edge thereof and parallel to but spaced from said pivot mounting, said movable storm window frame having border bars spaced outwardly in a direction generally perpendicular to the plane of said movable prime window frame from the flanges of the border bars of said prime window frame and including flanges extending generally perpendicular to the plane of said movable storm window frame toward said fixed frame and engageable with the flanges of the border bars of said fixed frame, a rigid bracket carried by a border bar of one of said movable frames at a point remote from the pivoted edge thereof and engageable as a slidable abutment with the corresponding border bar of the other movable frame to cause outward swinging movement of the prime window movable frame to swing the storm window movable frame outwardly, a pin on said bracket, and an elongated member carried by the other movable frame and having an elongated flange portion extending parallel to a bar thereof to define with the adjacent portion of the bar a pin receiving slot.

6. A window construction comprising a fixed rectangular frame having border bars having flanges extending parallel to the plane of the fixed frame, a movable prime window frame mounted on said fixed frame for outward pivotal movement about a pivot mounting located adjacent one edge thereof, and having border bars including weathering flanges extending outwardly parallel to the plane of the movable frame and engageable with the flanges of the border bars of said fixed frame, a movable storm window frame for a storm window mounted on said fixed frame for outward pivotal movement about an axis adjacent an edge thereof and parallel to but spaced from said pivot mounting, said movable storm window frame having border bars spaced outwardly in a direction generally perpendicular to the plane of said movable prime window frame from the flanges of the border bars of said prime window frame and including flanges extending generally perpendicular to the plane of said movable storm window frame toward said fixed frame and engageable with the flanges of the border bars of said fixed frame, a rigid bracket carried by a border bar of the movable prime window frame at a point remote from the pivoted edge thereof and engageable as a slidable abutment with the corresponding border bar of the movable storm window frame, a pin carried by said bracket, an elongated member carried by a border bar of said movable storm window frame having an elongated flange portion defining with the adjacent portion of the border bar a pin receiving slot.

7. A window construction comprising a fixed rectangular frame having border bars having flanges extending parallel to the plane of the fixed frame, a movable prime window frame mounted on said fixed frame for outward pivotal movement about a pivot mounting located adjacent one edge thereof, and having border bars including weathering flanges extending outwardly parallel to the plane of the movable frame and engageable with the flanges of the border bars of said fixed frame, a movable storm window frame for a storm window mounted on said fixed frame for outward pivotal movement about an axis adjacent an edge thereof and parallel to but spaced from said pivot mounting, said movable storm window frame having border bars spaced outwardly in a direction generally perpendicular to the plane of said movable prime window frame from the flanges of the border bars of said prime window frame and including flanges extending generally perpendicular to the plane of said movable storm window frame toward said fixed frame and engageable with the flanges of the border bars of said fixed frame, a pin carried by a border bar of the movable prime window frame and at least partially located in the space between the border bars of said movable frames which extend generally perpendicular to the pivot axis thereof, a member carried by the flange of the border bar of said movable storm window frame and including an elongated flange spaced from a portion of such border bar to define therewith an elongated pin receiving slot.

8. A window construction comprising a fixed rectangular frame having border bars having flanges extending parallel to the plane of the fixed frame, a movable prime window frame mounted on said fixed frame for outward pivotal movement about a pivot mounting located adjacent one edge thereof, and having border bars including weathering flanges extending outwardly parallel to the plane of the movable frame and engageable with the flanges of the border bars of said fixed frame, a movable storm window frame for a storm window mounted on said fixed frame for outward pivotal movement about an axis adjacent an edge thereof and parallel to but spaced from said pivot mounting, said movable storm window frame having border bars spaced outwardly in direction generally perpendicular to the plane of said movable prime window frame from the flanges of the border bars of said prime window frame and including flanges extending generally perpendicular to the plane of said movable storm window frame toward said fixed frame and engageable with the flanges of the border bars of said fixed frame, a pin carried by a border bar of the movable prime window frame and at least partially located in the space between the border bars of said movable frames which extend generally perpendicular to the axis of the pivot mounting thereof, a member carried by the flange of the border bar of said movable storm window frame and including an elongated flange spaced from a portion of such border bar to define therewith an elongated pin receiving slot, the flange of the border bar of the movable storm window frame on which said member is mounted having an elongated opening, clamp means extending through said opening, movable therein, and engaging said member to clamp said member in a position in which said elongated flange overlies said pin or to release it and move it to a position in which said pin is clear of said elongated flange.

9. A window construction comprising a fixed rectangular frame having border bars having flanges extending parallel to the plane of the fixed frame, a movable prime wndow frame mounted on said fixed frame for outward pivotal movement about a pivot mounting located adjacent one edge thereof, and having border bars including weathering flanges extending outwardly parallel to the plane of the movable frame and engageable with the flanges of the border bars of said fixed frame, a movable storm window frame for a storm window mounted on said fixed frame for outward pivotal movement about an axis adjacent an edge thereof and parallel to but spaced from said pivot mounting, said movable storm window frame having border bars spaced outwardly in a direction generally perpendicular to the plane of said movable prime window frame from the flanges of the border bars of said prime window frame and including flanges extending generally perpendicular to the plane of said movable storm window frame toward said fixed frame and engageable with the flanges of the border bars of said fixed frame, a pin carried by a border bar of the movable prime window frame and at least partially located in the space between the border bars of said movable frames which extend generally perpendicular to the axis of the pivot mounting thereof, a member carried by the flange of the border bar of said movable storm window frame and including an elongated flange spaced from a portion of such border bar to define therewith an elongated pin receiving slot, the flange of the border bar of the movable storm window frame on which said member is mounted having an elongated opening, clamp means extending through said opening, movable therein, and engaging said member to clamp said member in a position in which said elongated flange overlies said pin or to release it and move it to a position in which said pin is clear of said elongated flange, said member having an elongated portion within said space adapted to overlie said elongated opening in all positions of said member.

10. A window construction comprising a fixed rectangular frame having border bars having flanges extending parallel to the plane of the fixed frame, a movable prime window frame mounted on said fixed frame for outward pivotal movement about a pivot mounting located adjacent one edge thereof, and having border bars including weathering flanges extending outwardly parallel to the plane of the movable frame and engageable with the flanges of the border bars of said fixed frame, a movable storm window frame for a storm window mounted on said fixed frame for outward pivotal movement about an axis adjacent an edge thereof and parallel to but spaced from said pivot mounting, said movable storm window frame having border bars spaced outwardly in a direction generally perpendicular to the plane of said movable prime window frame from the flanges of the border bars of said prime window frame and including flanges extending generally perpendicular to the plane of said movable storm window frame toward said fixed frame and engageable with the flanges of the border bars of said fixed frame, a pin carried by a border bar of the movable prime window frame and at least partially located in the space between the border bars of said movable frames which extend generally perpendicular to the axis of the pivot mounting thereof, a member carried by the flange of the border bar of said movable storm window frame and including an elongated flange spaced from a portion of such border to define therewith an elongated pin receiving slot, the flange of the border bar of the movable storm window frame on which said member is mounted having an elongated opening, clamp means extending through said opening, movable therein, and engaging said member to clamp said member in a position in which said elongated flange overlies said pin or to release it and move it to a position in which said pin is clear of said elongated flange, an elongated cover plate of the storm window side of the flange on which said member is mounted having an opening through which said clamp means extends, said cover plate being dimensioned to cover and conceal said elongated opening in all positions of said member.

References Cited in the file of this patent
UNITED STATES PATENTS

| | | |
|---|---|---|
| 618,457 | Grahn | Jan. 31, 1899 |
| 1,701,516 | Thompson | Feb. 12, 1929 |
| 2,142,907 | Mains | Jan. 3, 1939 |
| 2,231,573 | Etling | Feb. 11, 1941 |
| 2,661,509 | Moriarty | Dec. 8, 1953 |
| 2,670,506 | Westad | Mar. 2, 1954 |